United States Patent
Rocroi et al.

(10) Patent No.: US 12,172,602 B2
(45) Date of Patent: *Dec. 24, 2024

(54) SYSTEM AND METHOD FOR EFFICIENT MANAGEMENT OF VEHICLE POWER MODES

(71) Applicant: RIVIAN IP HOLDINGS, LLC, Irvine, CA (US)

(72) Inventors: Thomas Rocroi, Richmond, CA (US); Ryan Kent, San Mateo, CA (US); Akash Sridhara Acharya, San Jose, CA (US); Leonid Kokhnovych, Burnaby (CA); Hyundoo Shin, San Jose, CA (US); Nicolas Viglucci, Costa Mesa, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,489

(22) Filed: Aug. 16, 2023

(65) Prior Publication Data
US 2023/0391289 A1  Dec. 7, 2023

Related U.S. Application Data

(63) Continuation of application No. 17/836,380, filed on Jun. 9, 2022, now Pat. No. 11,745,700.

(60) Provisional application No. 63/240,654, filed on Sep. 3, 2021.

(51) Int. Cl.
| | | |
|---|---|---|
| *B60R 25/40* | (2013.01) | |
| *B60R 16/023* | (2006.01) | |
| *B60R 25/24* | (2013.01) | |
| *B60R 25/34* | (2013.01) | |

(52) U.S. Cl.
CPC ........ *B60R 25/245* (2013.01); *B60R 16/0231* (2013.01); *B60R 25/34* (2013.01); *B60R 25/403* (2013.01)

(58) Field of Classification Search
CPC ... B60R 25/245; B60R 16/0231; B60R 25/34; B60R 25/403
See application file for complete search history.

(56) References Cited

U.S. PATENT DOCUMENTS

| | | |
|---|---|---|
| 5,790,536 A | 8/1998 | Mahany et al. |
| 6,236,333 B1 * | 5/2001 | King ............... B60R 25/2036 340/5.1 |
| 7,783,908 B2 | 8/2010 | Bogovac |

(Continued)

*Primary Examiner* — Nay Tun
(74) *Attorney, Agent, or Firm* — HALEY GUILIANO LLP

(57) ABSTRACT

Systems and methods are provided for controlling power modes of a vehicle and for providing passive entry to the vehicle. A sleep command can be sent from a central controller to multiple domain controllers to enter a sleep state. When the sleep command is received by a first domain controller, a sleep state is entered. When the sleep command is received by a second domain controller, a stealth state is entered. While in the stealth state, the second domain controller periodically wakes up from a sleep state to monitor a condition. In response to detecting a first condition, the second domain controller returns to the sleep state. In response to detecting a second condition, the second domain controller sends a notification of the second condition to the central controller.

18 Claims, 8 Drawing Sheets

(56) References Cited

U.S. PATENT DOCUMENTS

| | | |
|---|---|---|
| 9,021,075 B2 | 4/2015 | Rocher et al. |
| 9,173,087 B2 | 10/2015 | Pallotta |
| 9,194,168 B1 | 11/2015 | Lu et al. |
| 9,442,888 B2 | 9/2016 | Stanfield et al. |
| 10,189,400 B2 | 1/2019 | Danowski et al. |
| 10,850,715 B1 | 12/2020 | Decker et al. |
| 11,279,243 B1 | 3/2022 | Ashraf et al. |
| 11,608,028 B1 | 3/2023 | Kent et al. |
| 2004/0104815 A1 | 6/2004 | Suyama et al. |
| 2006/0114120 A1 | 6/2006 | Goldstone |
| 2008/0186870 A1 | 8/2008 | Butts et al. |
| 2010/0075656 A1 | 3/2010 | Howarter et al. |
| 2011/0046844 A1 | 2/2011 | Honner et al. |
| 2013/0024063 A1 | 1/2013 | Yamamoto et al. |
| 2013/0030634 A1 | 1/2013 | Endo et al. |
| 2013/0321637 A1 | 12/2013 | Frank et al. |
| 2015/0131477 A1 | 5/2015 | Balbierer et al. |
| 2015/0274126 A1* | 10/2015 | Nishiyama ............ B60R 25/245 701/2 |
| 2017/0050618 A1* | 2/2017 | Lickfelt ................ B60R 25/403 |
| 2017/0072876 A1 | 3/2017 | Rajan et al. |
| 2017/0088072 A1 | 3/2017 | Curtis et al. |
| 2017/0101076 A1 | 4/2017 | Krishnan |
| 2017/0318612 A1 | 11/2017 | Gu et al. |
| 2018/0037155 A1 | 2/2018 | Danowski et al. |
| 2018/0124213 A1* | 5/2018 | Wood ...................... H04L 47/50 |
| 2019/0037499 A1 | 1/2019 | Son et al. |
| 2019/0053154 A1 | 2/2019 | Song et al. |
| 2019/0116556 A1 | 4/2019 | Golsch et al. |
| 2019/0306703 A1* | 10/2019 | Golsch .................... H04W 4/80 |
| 2020/0103487 A1* | 4/2020 | Tzirkel-Hancock .... G01S 3/808 |
| 2020/0148032 A1 | 5/2020 | Skapof et al. |
| 2020/0290567 A1 | 9/2020 | Funyak et al. |
| 2020/0318413 A1* | 10/2020 | Zarders ................... E05F 15/76 |
| 2020/0403823 A1 | 12/2020 | Van Dijk |
| 2021/0237765 A1 | 8/2021 | Ando |
| 2021/0284098 A1 | 9/2021 | Scott et al. |
| 2022/0001835 A1 | 1/2022 | Kim et al. |
| 2022/0121412 A1* | 4/2022 | Kim ........................ G06F 3/147 |

* cited by examiner

SYSTEM AND METHOD FOR EFFICIENT MANAGEMENT OF VEHICLE POWER MODES

CROSS-REFERENCE TO RELATED APPLICATIONS

This application is a continuation application of U.S. application Ser. No. 17/836,380, filed Jun. 9, 2022, which claims priority to U.S. Provisional Patent Application No. 63/240,654, filed Sep. 3, 2021, the entire contents of which are hereby expressly incorporated by reference herein in their entirety.

INTRODUCTION

As vehicles become more complex and more connected, and autonomous driving becomes more prevalent, the computing power required by vehicles increases. In order to provide sufficient computing power to perform vehicle functions, vehicles may include an increasing number of controllers for performing power management functions.

SUMMARY

In some approaches, the user may have to manually unlock the vehicle or wait for certain controllers to wake up before operating the vehicle or before using certain features of the vehicle. Consequently, what is needed are techniques for managing power modes of the controllers to reduce unnecessary power consumption without interfering with the experience of the user.

In one approach, in order to reduce unnecessary power consumption by the controllers when the vehicle is not in use, it may be advantageous to turn off the controllers (or enter a sleep state) when a user leaves the vehicle and to turn on (or wake up) the controllers when the user returns to the vehicle.

To solve one or more of these problems, systems and methods are provided for managing power modes of the controllers of the vehicle to reduce unnecessary power consumption without interfering with the experience of the user by initiating a wake-up action (e.g., of controllers that require a relatively long time to wake up) in response to determining that a device (e.g., a mobile device of the user) is within a first distance from the vehicle. Additionally, by initiating the wake-up action before the user arrives at the vehicle, a welcome action of the vehicle (e.g., to greet the user) may be initiated in response to determining that the device is within a second distance from the vehicle.

In accordance with the present disclosure, a method is provided for providing passive entry to a vehicle associated with a user, and may include in response to determining that a device is within a first distance from the vehicle, initiating a wake-up action of the vehicle; and in response to determining that the device is within a second distance from the vehicle, initiating a welcome action of the vehicle. The wake-up action includes a central controller (e.g., a central gateway) transitioning one or more electronic control units (ECUs) or at least one program module from a first state to a second state, and the welcome action includes the central controller causing the one or more ECUs or the at least one program module of the vehicle to execute an action associated with the vehicle.

In some embodiments, initiating the wake-up action may include initiating a wake-up sequence of the one or more ECUs or the at least one program module of the vehicle or at least one program module of the vehicle. In some embodiments, the sequence may include transitioning the one or more ECUs or the at least one program module from a sleep state to an active state.

In some embodiments, initiating the welcome action may include unlocking a door of the vehicle, and at least one of turning on an exterior light of the vehicle, turning on an interior light of the vehicle, and outputting, via a speaker of the vehicle, a welcome sound that is audible from outside the vehicle.

In some embodiments, the first distance may be approximately 25 meters and the second distance may be approximately 2 meters.

In some embodiments, the device may be a mobile device, and the method may further include, detecting the mobile device when the mobile device is outside the first distance from the first vehicle; monitoring a distance of the mobile device from the vehicle, and in response to determining that the mobile device is within the first distance from the vehicle based on the monitored distance, establishing a two-way wireless connection between the vehicle and the mobile device, wherein the two-way wireless connection is a connection via Bluetooth Low Energy (BLE) standard.

In some embodiments, the method may further include detecting, via a plurality of sensors of the vehicle, a signal from the device, determining, for each of the a plurality of sensors, a received signal strength indicator (RSSI) of the signal, and determining, based on the determined RSSI of the signal detected by each of the a plurality of sensors, a distance of the device from the vehicle. In some embodiments, the determination that the device is within the first distance from the vehicle and the determination that the device is within the second distance from the vehicle may be based on the determined distance.

In some embodiments, the device may be a key fob associated with the vehicle.

In some embodiments, the method may further include identifying a user profile associated with the device, and personalizing the welcome action based on the identified user profile.

In some embodiments, the method may further include determining a location of the vehicle, and in response to determining that the determined location is a home location of the vehicle, refraining from initiating the wake-up action unless an additional device is also determined to be within the first distance or the device is determined to be within the second distance.

In some embodiments, the method may further include determining a location of the vehicle and determining whether to open a storage door of the vehicle, based on the determined location. In some embodiments, initiating the welcome action may include opening the door of the vehicle in response to determining to open the storage door of the vehicle.

In some embodiments, a system for providing passive entry to a vehicle is provided. The system includes a memory storing instructions, and control circuitry configured to execute the instructions stored in the memory to: initiate, in response to determining that a device is within a first distance from a vehicle, a wake-up action of the vehicle; and initiate, in response to determining that the device is within a second distance from the vehicle, a welcome action of the vehicle. The wake-up action includes transitioning one or more electronic control units (ECUs) or at least one program module from a first state to a second state, and the welcome action includes causing the one or more ECUs or the at least one program module of the vehicle to execute an action associated with the vehicle.

In some embodiments, a non-transitory computer-readable medium having non-transitory computer-readable instructions encoded thereon is provided. When the instructions are executed by control circuitry, the instructions cause the control circuitry to: initiate, in response to determining that a device associated with a user is within a first distance from a vehicle, a wake-up action of the vehicle; and initiate, in response to determining that the device is within a second distance from the vehicle, a welcome action of the vehicle. The wake-up action includes transitioning one or more electronic control units (ECUs) or at least one program module from a first state to a second state. The welcome action includes causing the one or more ECUs or the at least one program module of the vehicle to execute an action associated with the vehicle.

In some embodiments, a system for controlling power modes of a vehicle is provided. The system includes a plurality of domain controllers, including a first domain controller and a second domain controller, and a central controller configured to send a sleep command to each of the plurality of domain controllers to enter a sleep state. The first domain controller is configured to enter a sleep state in response to receiving the sleep command. The second domain controller is configured to enter a stealth state in response to receiving the sleep command, and, while in the stealth state, periodically wake up from a sleep state to monitor a condition. Each of the plurality of domain controllers includes an electronic control unit (ECU).

In some embodiments, the second domain controller may be further configured, while in the stealth state, to: in response to detecting a first condition, return to the sleep state; and in response to detecting a second condition, send a notification of the second condition to the central controller.

In some embodiments, the central controller may be further configured, in response to receiving the notification of the second condition, to send a command to each of the plurality of domain controllers to enter a new state.

In some embodiments, the new state may be a standby state, and the plurality of domain controllers may further include a third domain controller. In some embodiments, the third domain controller may be configured to detect a third condition, and in response to detecting the third condition, send a notification of the third condition to the central controller. In some embodiments, the central controller may be further configured, in response to receiving the notification of the third condition, to send a command to each of the plurality of domain controllers to enter a ready state.

In some embodiments, the first domain controller may be a vehicle dynamics module, the second domain controller may be a user proximity module, the second domain controller may be further configured, when detecting the first condition, to detect no authorized device within a range of the vehicle, the second domain controller may be further configured, when detecting the second condition, to detect the authorized device within the range of the vehicle, the third domain controller may be a body control module, and the third domain controller may be further configured, when detecting the third condition, to detect an open door of the vehicle.

In some embodiments, the first domain controller may be one from among an experience management module, an autonomous control module, an autonomous safety module, and a vehicle dynamics module. In some embodiments, the second domain controller may be one from among a telematics control module, a body control module, an intelligent battery sensor, a battery management system, and a thermal management module.

In some embodiments, the central controller may be configured to send the sleep command and the command to enter the new state to each of the plurality of domain controllers using a C-Bus protocol.

In some embodiments, while the plurality of domain controllers is in a wake state: the second domain controller may be further configured to detect the first condition, and in response to detecting the first condition, send a notification of the first condition to the central controller. The central controller may be further configured, in response to receiving the notification of the first condition, to send the sleep command to each of the plurality of domain controllers to enter the sleep state.

In some embodiments, the central controller may be further configured to receive a selection of a first mode from a plurality of modes, and in response to receiving the selection of the first mode, send a first mode command to each of the plurality of domain controllers to enter the first mode. In some embodiments, the first domain controller may be configured to enter the sleep state in response to receiving the first mode command, and the second domain controller may be configured to remain in a wake state in response to receiving the first mode command.

In some embodiments, the first mode may be a pet mode, the first domain controller may be an experience management module, and the second domain controller may be a body control module.

In some embodiments, a method for controlling power modes of a vehicle is provided. The method includes sending, via a central control, a sleep command to each of a plurality of domain controllers, which includes a first domain controller and a second domain controller, to enter a sleep state. The method further includes, entering, by the first domain controller, a sleep state in response to receiving the sleep command. The method further includes, entering, by the second domain controller, a stealth state in response to receiving the sleep command, and, while in the stealth state, periodically waking up from a sleep state to monitor a condition. Each of the plurality of domain controllers includes an electronic control unit (ECU).

In some embodiments, a non-transitory computer-readable medium having non-transitory computer-readable instructions encoded thereon is provided. When the instructions are executed by control circuitry, the instructions cause the control circuitry to send, from a central controller to a plurality of domain controllers, a sleep command to each of the plurality of domain controllers to enter a sleep state. The instructions further cause the control circuitry to, when the plurality of domain controllers receives the sleep command from the central controller: enter, by a first domain controller of the plurality of domain controllers, a sleep state in response to receiving the sleep command; and enter, by a second domain controller of the plurality of domain controllers, a stealth state in response to receiving the sleep command. The instructions further cause the control circuitry to, while in the stealth state, periodically wake up from a sleep state, by the second domain controller, to monitor a condition. Each of the plurality of domain controllers include an electronic control unit (ECU).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
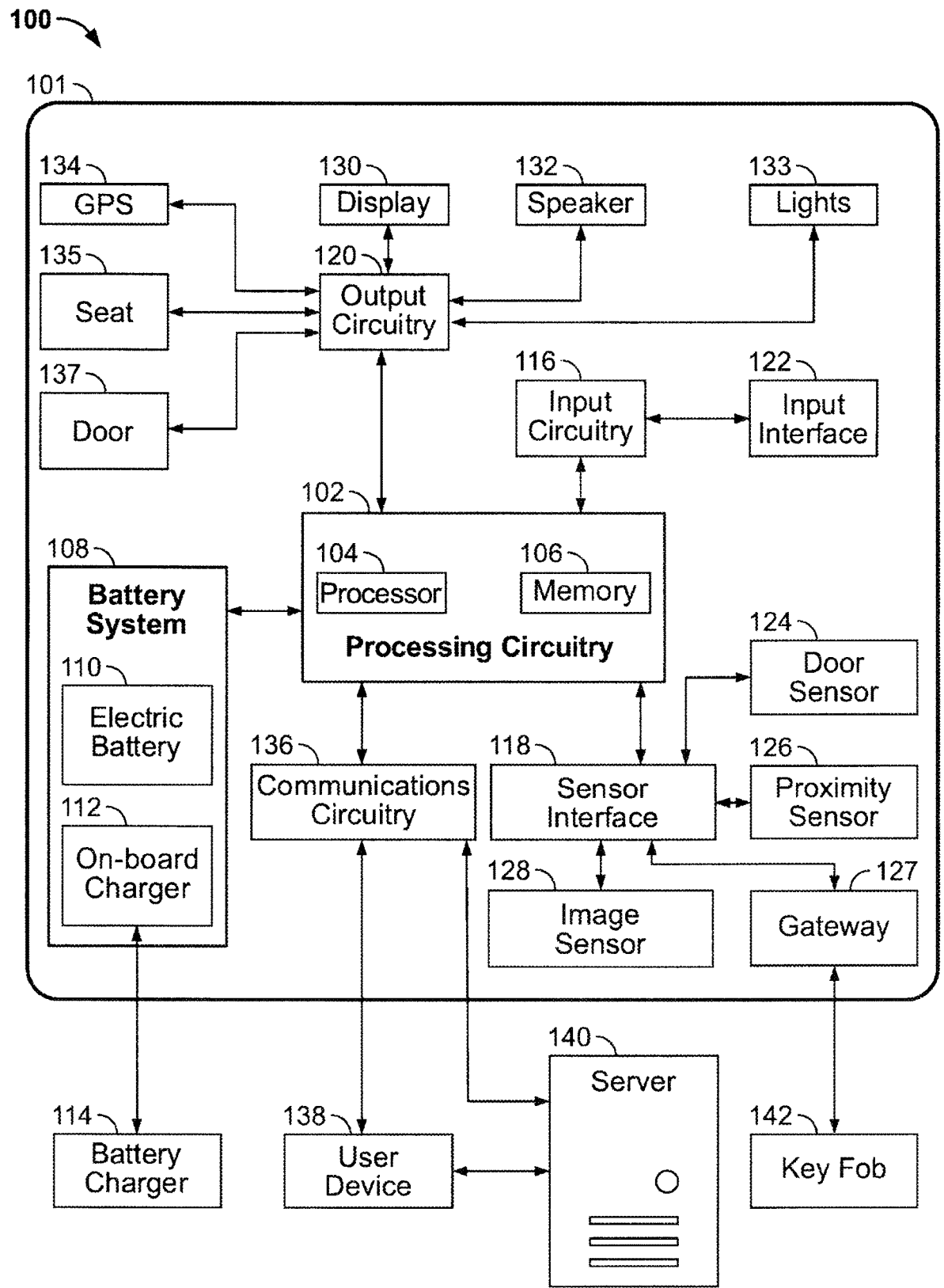
FIG. 1 shows a block diagram of components of a system of a vehicle for providing passive entry to an approaching user of the vehicle (e.g., the driver) and for controlling power modes of the vehicle (e.g., vehicle power modes), in accordance with some embodiments of the present disclosure.

FIG. 1 shows a block diagram of components of a system 100 of vehicle 101 for providing passive entry to an approaching user of vehicle 101 (e.g., the driver) and for controlling power modes of vehicle 101 (e.g., vehicle power modes), in accordance with some embodiments of the present disclosure. Vehicle 101 may be a car (e.g., a coupe, a sedan, a truck, an SUV, a bus), a motorcycle, an aircraft (e.g., a drone), a watercraft (e.g., a boat), or any other type of vehicle.

Vehicle 101 may comprise processing circuitry 102, which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection. As discussed in further detail with reference to FIG. 2, processing circuitry may comprise a central controller and a plurality of domain controllers.

Processing circuitry 102 may be communicatively connected to battery system 108, which may be configured to provide power to one or more of the components of vehicle 101 during operation. Although vehicle 101 is described as being an electric vehicle, it should be understood that vehicle 101 may be any suitable type of vehicle (e.g., internal combustion engine vehicle, hybrid vehicle, etc.).

Battery system 108 may comprise electric battery 110, which may include one or more battery modules. Battery system 108 may further comprise on-board charger 112 to manage the flow of electricity to electric battery 110 (e.g., to perform AC-DC conversion when battery charger 114 is an A.C. charger), and any other suitable components. In some embodiments, on-board charger 112 may include connectors for interfacing with battery charger 114. Battery system 108 may be configured to manage charging of battery 110, which may include measuring one or more characteristics of battery 110, identifying if a fault has occurred, providing power to components of vehicle 101, communicating with battery charger 114, any other suitable actions, or any combination thereof. In some embodiments, battery system 108 may include one or more domain controllers configured to perform battery monitoring, charge, and discharge functions, as described in greater detail with reference to FIG. 2. Battery system 108 may include, for example, electrical components (e.g., switches, bus bars, resistors, capacitors), control circuitry (e.g., for controlling suitable electrical components), and measurement equipment (e.g., to measure voltage, current, impedance, frequency, temperature, or another parameter). Battery system 108 may provide charge status information to processing circuitry 102. Charge status information includes, for example, charge level, whether the battery is being charged, charging current, charging voltage, charging mode, and whether a charging fault exists.

Battery charger 114 may be coupled to a power source, e.g., a power transmission grid, a solar panel, a generator, a wind turbine, or another vehicle, and may be configured to provide charging current at a suitable charging voltage to electric battery 110 of vehicle 101. In some embodiments, battery charger 114 may correspond to a charger at a D.C. station (e.g., D.C. fast electric charging station) or A.C. station. Battery charger 114 may be, for example, a fixed charging station (e.g., a charging station installed in a public location or in a user's home), or a portable charger (e.g., a charger connected to a portable generator, a portable solar panel, or another vehicle). In some embodiments, battery charger 114 may be capable of charging electric battery 110 at one or more voltages, with one or more current limitations. For example, battery charger 114 may receive information from battery system 108 indicating what voltage, current, or both, vehicle 101 may be charged with. Battery charger 114 may provide a charging current that is limited by one or more constraints. For example, vehicle 101 may communicate to battery charger 114 what charging current is desired for charging. In a further example, a cable type may have a maximum associated current capacity based on insulation and heat transfer considerations. In some embodiments, battery charger 114 and on-board charger 112, support both the inflow and outflow of current from electric battery 110 via a coupling. For example, during vehicle to vehicle charging or vehicle to grid power supply, battery charger 114 and/or on-board charger 112 may direct power from electric battery 110 to a power source coupled to battery charger 114, such as a battery of another vehicle or an electric power grid.

Image sensor 128 (e.g., a camera) may be communicatively coupled to processing circuitry 102 (e.g., by way of sensor interface 118) and positioned at any suitable position in an interior or exterior of vehicle 101. In some embodiments, image sensor 128 may capture images of destinations traveled to by vehicle 101 to identify driving habits of vehicle 101. Processing circuitry 102 may be communicatively connected to input interface 122 (e.g., a steering wheel, a touch screen display, buttons, knobs, a microphone or other audio capture device, etc.) via input circuitry 116. In some embodiments, a driver of vehicle 101 may be permitted to select certain settings in connection with the operation of vehicle 101 (e.g., input a range selection, etc.). In some embodiments, processing circuitry 102 may be communicatively connected to Global Positioning System (GPS) system 134 of vehicle 101, where the driver may interact with the GPS system via input interface 122. GPS system 134 may be in communication with multiple satellites to ascertain the vehicle's location and provide navigation directions to processing circuitry 102. As another example, the positioning device may operate on terrestrial signals, such as cell phone signals, Wi-Fi signals, or ultra-wideband signals to determine a location of vehicle 101. The determined location may be in any suitable form such as a geographic coordinate, a street address, a nearby landmark such as an identification of the nearest charging station or a tagged location associated with the vehicle (e.g., a location of a home of the user stored in memory 106).

Processing circuitry 102 may be communicatively connected to display 130, speaker 132, lights 133, seat 135, and door 137 by way of output circuitry 120. In some embodiments, output circuitry 120 may comprise one or more domain controllers, as described in greater detail with reference to FIG. 2. Display 130 may be located at a dashboard of vehicle 101 and/or a heads-up display at a windshield of vehicle 101. For example, an interface for GPS system 134 or an interface of an infotainment system may be generated for display, and display 130 may comprise an LCD display, an OLED display, an LED display, or any other type of display. In some embodiments, display 130 may provide a driver with a navigation interface, an entertainment interface, a backup camera interface, etc. Speaker 132 may be located at any location within the cabin of vehicle 101, e.g., at the dashboard of vehicle 101, on an interior portion of the vehicle door. In some embodiments, speaker 132 may be configured to provide audio alerts related to intermediate charging range information and estimated charge time information based on information output by battery system 108. In some embodiments, speaker 132 may provide audio that is audible outside of vehicle 101 (e.g., a personalized greeting during a welcome action of the vehicle). Lights 133 may be interior or exterior lights that provide light from inside or outside of vehicle 101 (e.g., during a welcome action of the vehicle).

Processing circuitry 102 may be communicatively connected (e.g., by way of sensor interface 118) to door sensor 124 (e.g., which may sense an open door of vehicle 101), proximity sensor 126 (e.g., which may determine the distance separating a device (e.g., key fob 142) and vehicle 101), and gateway 127 (e.g., which may be configured to receive signals from a key fob associated with vehicle 101 (e.g., key fob 142).

In some embodiments, processing circuitry 102 may be in communication (e.g., via communications circuitry 136) with user device 138 (e.g., a mobile device, a computer, key fob 142, etc.). Such connection may be wired or wireless. In one example, such a connection is a two-way connection via the Bluetooth Low Energy (BLE) standard. In some embodiments, user device 138 may execute instructions stored in memory to run a vehicle interface application, e.g., to provide information related to vehicle 101. In some embodiments, communications circuitry and/or user device 138 may be in communication with one or more servers 140 (e.g., over a communications network such as, for example, the Internet).

It should be appreciated that FIG. 1 only shows some of the components of vehicle 101, and it will be understood that vehicle 101 also includes other elements commonly found in vehicles (e.g., vehicles), e.g., a motor, brakes, wheels, wheel controls, turn signals, windows, doors, etc. Vehicle 101 may also include a plurality of domain controllers and a central controller for managing power modes of components of vehicle 101, as shown in greater detail with reference to FIG. 2.

Figure 2:
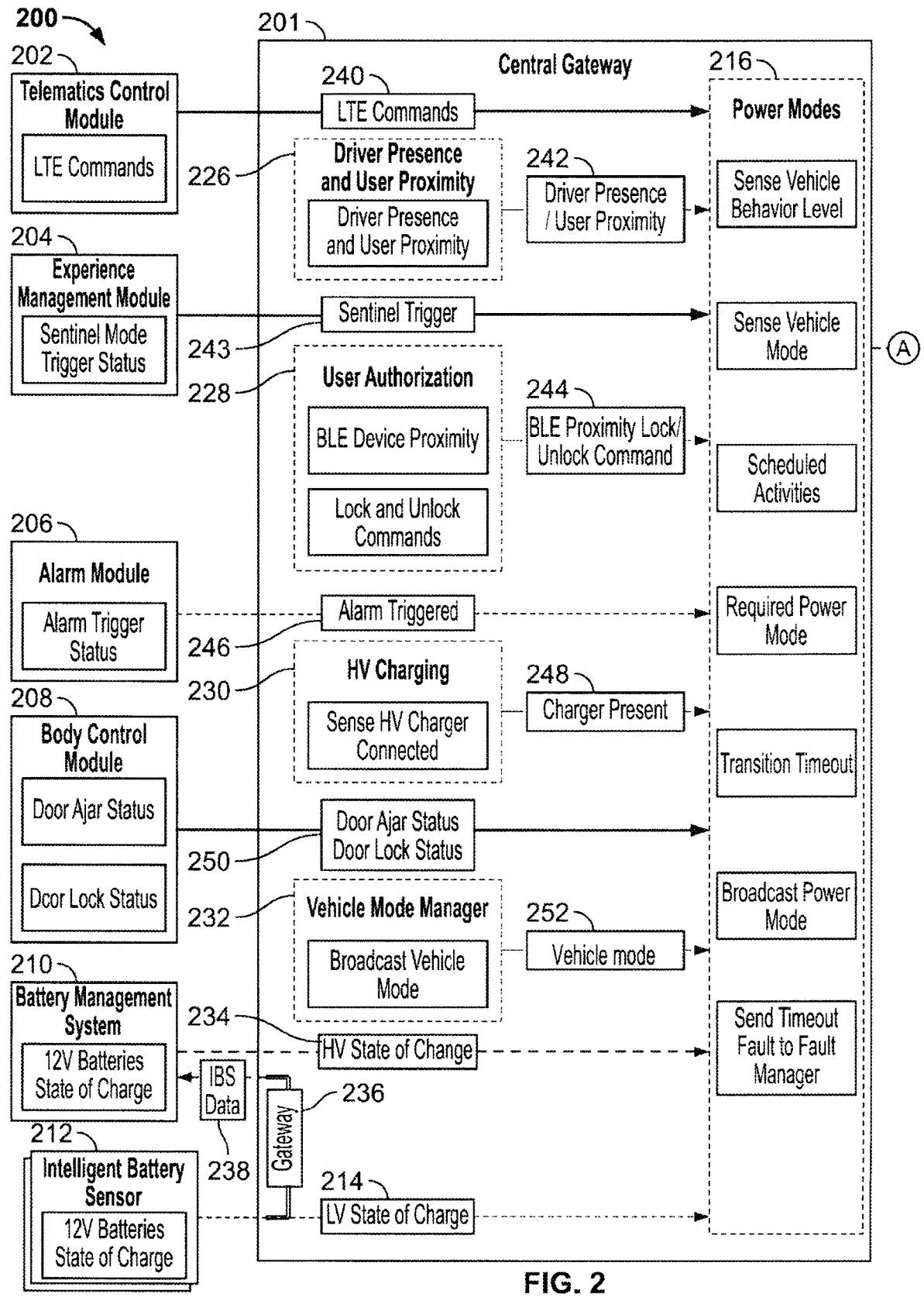
FIG. 2 shows a block diagram of an illustrative control system including a central gateway 201 (e.g., central controller) and a plurality of domain controllers (e.g., modules), in accordance with some embodiments of the present disclosure.
Figure 2:
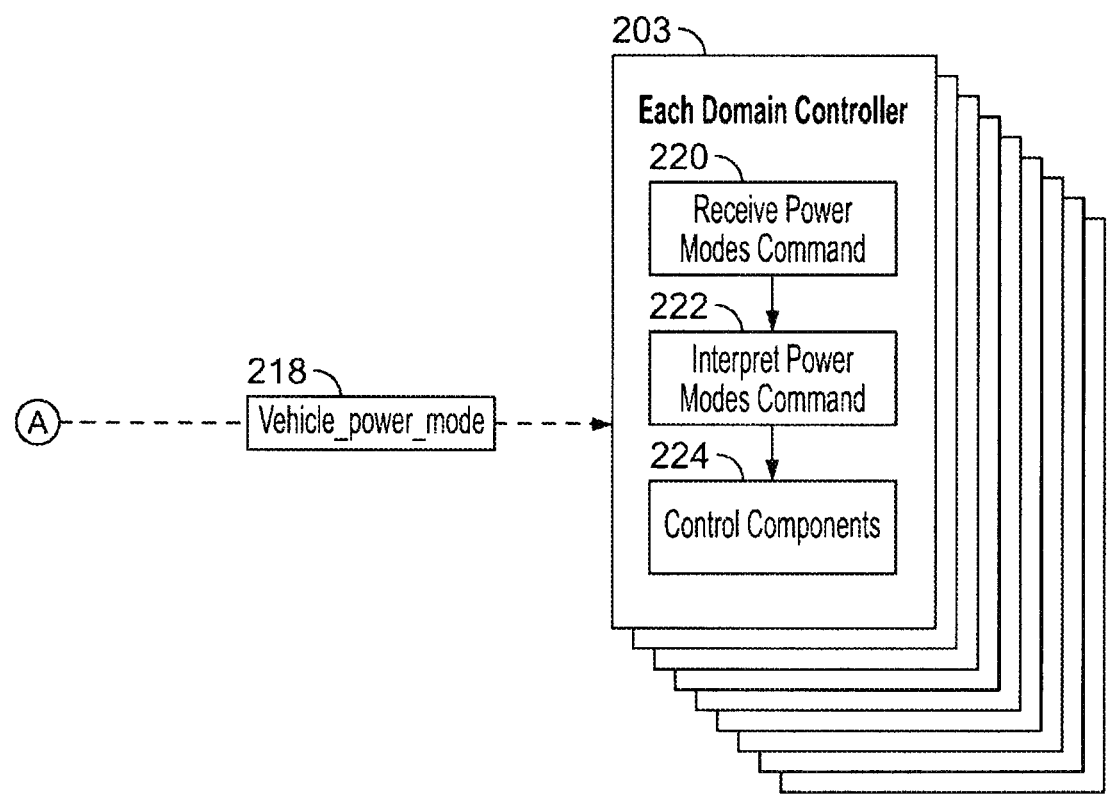

FIG. 2 shows a block diagram of illustrative control system 200 comprising a central gateway 201 (e.g., central controller) and a plurality of domain controllers 203 (e.g., modules), in accordance with some embodiments of the present disclosure. The illustrative control system may correspond to certain elements illustrated in FIG. 1 (e.g., processing circuitry 102, sensor interface 118, output circuitry 120, etc.). Control system 200 may implement a power modes application to coordinate vehicle-level management of wake and sleep behaviors of devices in vehicle 101. For example, the power modes application may coordinate vehicle-level management of wake and sleep behaviors of devices of vehicle 101 to reduce unnecessary power consumption by the controllers/devices of vehicle 101, while making vehicle 101 appear to a user as though it is always on. As shown, domain controllers 203 may include, e.g., telematics control module (TCM) 202, experience management module (WM) 204, alarm module 206, body control module (BCM) 208, battery management system (BMS) 210, and intelligent battery sensor (IBS) S) 212. However, these are only some examples, and domain controllers 203 may include other suitable vehicle modules such as an autonomous control module (ACM), an autonomous safety module (ASM), a vehicle dynamics module (VDM), a thermal management module (TMM), etc. Domain controllers 203 may control certain functions of vehicle 101. Network management by the power modes application may allow for coordination between different power-saving states (e.g., a sleep state, a standby state, a ready state, and a stealth state) and an ON state (i.e., a wake (awake) state, or a go state) of the distributed domain controllers 203 within vehicle 101. The power-saving states may turn off certain hardware and/or software resources, as well as reduce the frequency of certain checks or control routines. In one embodiment, a domain controller in a stealth state may appear to be off to the other ones of domain controllers 203 and to central gateway 201, but itself is able to wake up (e.g., from a sleep state) and wake downstream components to perform any functionality that is not dependent on another subsystem. For example, IBS 212, while in a stealth state, may periodically wake itself up to monitor conditions of the electric battery 110 (e.g., battery state of charge, battery voltage, etc.) without waking up any other domain controllers 203 (ECUs). If IBS 212 detects a condition that needs to be reported to central gateway 201 (e.g., a low battery condition), IBS 212 sends a notification (e.g., low voltage (LV) state of charge notification 234) to central gateway 201 to inform central gateway 201 of the condition. Otherwise, IBS 212 returns to a sleep mode until the next scheduled wake-up time to monitor the specified conditions. In some embodiments, IBS 212 also communicates IBS data 238 to BMS 210 through gateway 236. In response to receiving a notification (e.g., notification 214), central gateway 201 may compute, e.g., by power modes module 216, the required power mode of control system 200 (e.g., a standby state) and broadcast the power mode (e.g., by vehicle power mode command 218) to each of the plurality of domain controllers 203 (e.g., using a C-Bus protocol). In response to receiving vehicle power mode command 218 at step 220, each of the plurality of domain controllers 203 may interpret vehicle power mode command 218 and make a determination of whether to update their current state (e.g., distributed responsibility) at step 222, and control respective components and optionally update their current state based on the result of the determination at step 224.

Central gateway 201 and the plurality of domain controllers 203 may be implemented using software running on one or more general purpose or specialized processors (e.g., electronic control units (ECUs) or electronic control modules (ECMs)). For example, in one embodiment, as shown, control system 200 may be implemented by a plurality of devices (modules) and a plurality of software components.

Control gateway 201 and one or more of the plurality of domain controllers 203 may implement different types of suitable functions for the operation of vehicle 101. For example, control gateway 201 and one or more of the plurality of domain controllers 203 implement sense functions (e.g., for monitoring or detecting a condition), compute functions (e.g., for computing a power mode or computing a value-based input from the sense functions), and act functions (e.g., to send a notification or command or broadcast a power mode, or to implement control).

In one example, the sense functions for vehicle 101 may include an authorized Bluetooth low energy (BLE) device proximity for determining the location/proximity of authorized BLE devices, a driver presence function to determine if a driver is present, a lock and unlock commands function for receiving lock/unlock commands, a 12V battery state of charge (SOC) function for determining if the low voltage (LV) batteries need to be charged, an LTE commands function for receiving LTE commands vehicle functionality, a door ajar status function detecting when a door is ajar, a scheduled activity function for scheduling activities on an internal clock timer, an alarm trigger status function for waking the vehicle when an alarm is triggered, a sentinel mode trigger status function for waking the vehicle when a sentinel mode triggers an alert, a vehicle behavior level function for sensing the current vehicle behavior level, a vehicle mode for sensing the current vehicle power mode, a high voltage (HV) charger connected function for sensing if an HV charger is connected, a receive vehicle power mode command function for receiving a vehicle power mode command (e.g., vehicle power mode command 218), etc.

In one example, the compute functions for vehicle 101 may include a required power mode function for computing the required power mode state, a transition time out function for imitating timeout for controller mode acknowledgments, an interpret vehicle power mode command function for determining which devices (e.g., domain controllers 203) need to be one or off based on a received vehicle power mode command, etc.

In one example, the act functions for vehicle 101 may include a broadcast power mode function for broadcasting the power mode to the vehicle, a send timeout fault function for sending a timeout fault to a fault manager, a control components function for turning domain devices (e.g., domain controllers 203) ON or OFF based on a power mode interpretation, etc.

It should be understood that the functions described above and illustrated in FIG. 2 are simply examples, and control system 200 may execute numerous other functions to maintain smooth operation and transitions between operating states, while reducing unnecessary power consumption when vehicle 101 or functions of vehicle 101 are not in use. Although some functions are illustrated or described as being performed by central gateway 201, this is only an example one or more of these functions may be performed by one of more of domain controllers 203. For example, in one embodiment, central gateway 201 may implement the BLE device proximity function to determine the location of authorized BLE devices (e.g., a mobile device of a user that is associated with vehicle 101). However, this is only an example, and it should be understood that a dedicated domain controller (e.g., a vehicle access system (VAS) module) may also perform this function.

As shown, certain components of control system 200 may communicate via a local interconnect network (LIN) protocol, a C-Bus protocol, Ethernet, by internet communication, etc. For example, as shown, BCM 208 may be implemented as a device (e.g., including an ECU) and may include a plurality of sense functions, including a door ajar status function and a door lock status function.

In one embodiment, as shown, central gateway 201 may be configured to implement driver presence module and user proximity module 226, user authorization module 228, HV charging module 230, and vehicle mode manager 232. However, this is only an example, and these modules may be implemented by individual domain controllers or by a combined domain controller (e.g., the VAS module). Driver presence module and user proximity module 226 may implement the driver presence and user proximity function, which may provide passive entry to vehicle 101, as described in further detail below. As shown, driver presence and user proximity module 226 may communicate driver presence/user proximity notification 242 to power modes module 216 (e.g., based on a determined driver presence or user proximity). User authorization module 228 may implement the BLE device proximity function and the lock and unlock commands function and may communicate BLE proximity lock/unlock command 244 to power modes module 216 (e.g., based on a determined BLE device proximity or received lock/unlock command). HV charging module 230 may implement the sense HV charger connected function and may communicate charger present notification 248 to power modes module 216 (e.g., based on a detected HV charger). HV charging module 230 may also control operation of the HV batteries of vehicle 101 (e.g., to power different vehicle components). Vehicle mode manager 232 may implement the broadcast vehicle module function and may communicate vehicle mode notification 252 to power modes module 216 (e.g., based on the current vehicle power mode). Additionally, as shown, power modes module 216 may implement a plurality of functions (e.g., the sense vehicle behavior level function, the sense vehicle mode function, the scheduled activities function, the required power mode function, the transition timeout function, the broadcast power mode function, and the send timeout fault to fault manager function) to generate and broadcast vehicle power mode command 218 to each of the plurality of domain controllers 203, as described above.

In one embodiment, as shown, TCM 202 may implement the LTE commands function and may communicate LTC commands 240 to central gateway 201. XMM 204 may implement the sentinel mode trigger status and may communicate sentential trigger 243 to central gateway 201 (e.g., when sentinel mode reaches an escalation level, which may be adjusted by a user or based on historical data). Alarm module 206 may implement the alarm trigger states and may communicate alarm triggered notification 246 to central gateway 201. BCM 208 may implement the door ajar function and the door lock status and may communicate the door ajar/door lock status 250 to central gateway 201.

Although particular modules are described as implementing certain functions, it should be understood that this is only an example, and different modules may implement one or more functions described above or any other suitable vehicle functions.

Figure 3:
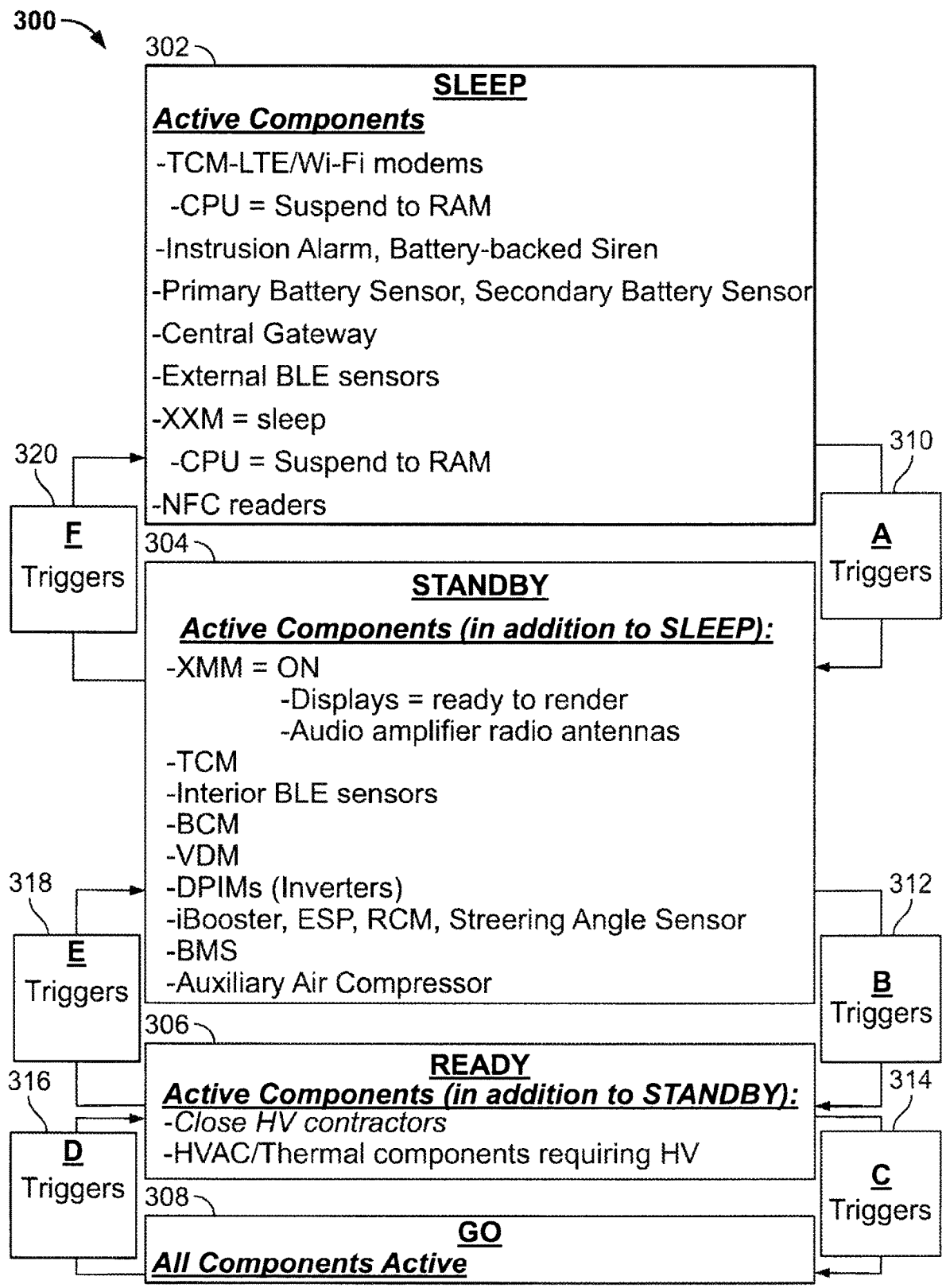
FIG. 3 illustrates a flow diagram of illustrative transitions between states of domain controllers of the control system of FIG. 2, in accordance with some embodiments of the present disclosure.

FIG. 3 illustrates a flow diagram 300 of illustrative transitions between states of domain controllers 203 of control system 200 of FIG. 2, in accordance with some embodiments of the present disclosure. As shown, domain controllers 203 may operate in one of a plurality of states (e.g., sleep, standby, ready, and go) based on the current vehicle power mode state (e.g., sleep state 302, standby state 304, ready state 306, and go state 308). Additionally, as shown, other components of vehicle 101 may be activated or deactivated based on the current vehicle power mode. Central gateway 201 may transition between the vehicle power mode states based on triggers (e.g., A 310, B 312, C 314, D 316, E 318, and F 320). In response to a determination to transition between vehicle power mode states, central gateway 201 broadcasts the updated vehicle power mode to each domain controller 203. For example, in response to determining that trigger A 310 is satisfied when the current vehicle power mode is sleep state 302, central gateway 201 broadcasts standby state 304 as the new vehicle power mode to domain controllers 203, which each interpret the broadcast power mode and make a determination of whether to update their current power state. For example, during a wake-up process (e.g., when a user is approaching vehicle 101), domain controllers 203 may interpret the broadcast vehicle power modes and make the determinations of whether to update their current state to a higher energy state (e.g., while transitioning from sleep state 302 to go state 308). Similarly, during a shut-down process (e.g., when a user leaves vehicle 101), domain controllers 203 may interpret the broadcast vehicle power modes and make the determinations of whether to update their current state to a lower energy state (e.g., while transitioning from go state 308 to sleep state 302). As described in further detail below, triggers (A 310-F 320) may include user and vehicle 101 actions or conditions that central gateway 201 to transition between vehicle power modes, as well as blockers and overrides that prevent transitions between vehicle power modes.

In sleep state 302, certain domain controllers may continue to operate periodically (e.g., a stealth state). For example, TCM 202 may continue to operate LTE/Wi-Fi modems but in a low-power state in which other components of TCM 202 are turned off (e.g., a suspend to RAM (STR) state). In an STR state, TCM 202 may be programmed to wake to perform other tasks at any given time. Other domain controllers may enter a sleep state in which they do not periodically wake to perform tasks unless, e.g., instructed by central gateway 201 to wake up (e.g., a true sleep state). For example, when a user has left vehicle 101 (e.g., triggering a lock command and timeout of a lock to sleep parameter) and central gateway 201 sends out a sleep command (e.g., vehicle power mode command 218) to each of the plurality of domain controllers 203. XMM 204, which operates the display and entertainment system, may enter a sleep state in response to receiving the sleep command from central gateway 201. XMM 204 may remain in the sleep state until receiving another command from central gateway 201 to change states (e.g., transition to a standby state when external BLE sensors of, e.g., the VAS, detects a user approaching vehicle 101). Thus, for example, if the user continues to vehicle 101 and opens the door, XMM 204 may quickly transition from the standby state to a ready state, and then to a go state (or full wake state) when the user is detected in vehicle 101. Thus, because, for example, the display and entertainment system are immediately ready to use when the user enters vehicle 101 (e.g., instead of having to wait for XMM 204 to boot up from a sleep state), unnecessary power consumption by XMM 204 is reduced (by transitioning to a sleep state when not in use), while not inconveniencing the user. Indeed, vehicle 101 will appear to a user to always be ready for use, as the user will not have to wait for booting of system components to finish.

Additionally, as shown, in some embodiments, in sleep state 302, the intrusion alarm and battery-based siren are active (e.g., through alarm module 206), as well as primary and secondary battery sensors (e.g., associated with IBS 212), central gateway 201 (or elements of central gateway 201), external BLE sensors, and NFC readers. However, this is only an example, and other suitable components or domain controllers may be active or partially active in sleep state 302.

As shown, while in sleep state 302, central gateway 201 may determine to transition to standby state 304, in response to trigger A 310 being satisfied. In some embodiments, trigger A 310 may be satisfied in response to either user actions or vehicle events occurring. In some embodiments, the user actions may include when: a VAS active entry is detected (e.g., from an associated FOB, mobile application (app), or NFC); a VAS passive entry is detected (e.g., user proximity within a predetermined range); a door ajar signal is received; certain LTE remote commands are received; a hazard switch is activated; a vehicle alarm alert is received, or eCall/SoS button is activated. In some embodiments, the vehicle event may include when: a CGM internal timer alarm is detected; a low battery alert is received; a scheduled HV charge is detected; a sentry mode alert is received; an HV charger pilot input is received; or cabin or battery thermal conditioning is required). In response to determining that trigger A 310 is satisfied, central gateway 201 transitions to standby state 304 and broadcasts the corresponding vehicle power mode to domain controllers 203.

In standby state 304, in addition to the active components of sleep state 302, the additional vehicle components and domain controllers may also be active: XMM 204 (e.g., so displays are ready to render and the audio amplifier and radio antennas are active), TCM 202, the interior BLE sensors, BCM 208, the VDM, dual-power inverter modules (DPIMs) (inverters), iBooster, ESP, RCM, and steering angle sensor, BMS 210, and the auxiliary air compressor. Activating BCM 208 may include activating door control modules, tailgate/liftgate control modules, all closure handles (e.g., doors, tailgate, trunk, frunk, gear tunnel), exterior lighting (e.g., functional and courtesy lighting), seat control modules, steering column adjust motors, etc.)

As shown, while in standby state 304, central gateway 201 may determine to transition to ready state 306, in response to trigger B 312 being satisfied (e.g., during a wake-up process) or to determine to transition to sleep state 302, in response to trigger F 320 being satisfied (e.g., during a shut-down process). In some embodiments, trigger B 312 may be satisfied when: a BLE device is determined to be within immediate range of vehicle 101 (e.g., within 2 meters); any vehicle door is opened; a vehicle seat is occupied; low voltage maintenance is required; a remote command requiring HV is received; or an HV charger is connected. In some embodiments, trigger B 312 may be blocked from being satisfied when an HV safety monitor fault is detected. In response to determining that trigger B 312 is satisfied (and not blocked), central gateway 201 transitions to ready state 306 and broadcasts the corresponding vehicle power mode to domain controller 203.

In ready state 306, in addition to the active components of standby state 304, the additional vehicle components and domain controllers may also be active: HV contactors may be closed, and HVAC/terminal components requiring HV As shown, while in ready state 306, central gateway 201 may determine to transition to go state 308, in response to trigger C 314 being satisfied (e.g., during a wake-up process) or to determine to transition to standby state 304, in response to trigger E 318 being satisfied (e.g., during a shut-down process). In some embodiments, trigger C 314 may be satisfied when the presence of the driver is detected or when a remote vehicle summon command is received.

In go state 308, all vehicle components and domain controllers are active. That is, any reminding vehicle components or domain controllers that were not active in ready state 306, are activated.

As shown, while in go state 308, central gateway 201 may determine to transition to ready state 306, in response to trigger D 316 being satisfied (e.g., during a shut-down process). In some embodiments, trigger D 316 may be satisfied when: no driver presence is detected (e.g., a driver exits vehicle 101); a pet mode is activate; an auto-park operation is competed; or propulsion is disabled (e.g., by the VDM). In some embodiments, trigger D 316 may be blocked (or overridden) from being satisfied when: the vehicle drive selector is set to reverse, neutral or drive (e.g., not park); no HV is allowed at the end of a drive; or an HV plug is connected. In some embodiments, in response to detecting the driver exiting vehicle 101, a timeout timer may be started. In response to determining that trigger D 316 is satisfied (and not blocked or overridden), central gateway 201 transitions to ready state 306 and broadcasts the corresponding vehicle power mode to domain controller 203.

As shown, while in ready state 306, central gateway 201 may determine to transition to standby state 304, in response to trigger E 318 being satisfied (e.g., during a shut-down process). In some embodiments, trigger E 318 may be satisfied when a user is still near vehicle (e.g., within twenty-five meters) or a low-voltage mode (LVM) is completed (e.g., low voltage batteries have been charged). In some embodiments, trigger E 318 may be blocked (or overridden) from being satisfied when: pet mode is active; post-drive thermal conditioning is being performed (e.g., to prevent overheating); HV charge is active; HV power export is active; a battery is in a safe state; or no HV is allowed at the end of a drive. For example, if a user initiates "Pet Mode" (or a pet is detected), monitoring the temperature in the cabin of the vehicle and providing heating/cooling to maintain the temperature within a range to keep a pet safe (e.g., by a heating/cooling domain controller) is performed, and central gateway 201 may be blocked from transitioning to a lower energy state (e.g., standby state 304). In response to determining that trigger E 318 is satisfied (and not blocked or overridden), central gateway 201 transitions to standby state 304 and broadcasts the corresponding vehicle power mode to domain controllers 203.

As shown, while in standby state 304, central gateway 201 may determine to transition to sleep state 302, in response to trigger F 320 being satisfied (e.g., during a shut-down process). In some embodiments, trigger F 320 may be satisfied when: a predetermined time has passed since a lock command was received (e.g., thirty seconds); all vehicle closures have been closed and a predetermined time has passed (e.g., two minutes); all but one or fewer vehicle closures have been closed (e.g., only the vehicle tailgate remains open) and a predetermined time has passed (e.g., ten minutes); or a sleep mode is requested. In some embodiments, trigger F 320 may be blocked (or overridden) from being satisfied when: vehicle 101 is not in park, OTA is engaged; HV is enabled; or UDS programming or extended session. In response to determining that trigger F 320 is satisfied (and not blocked or overridden), central gateway 201 transitions to sleep state 302 and broadcasts the corresponding vehicle power mode to domain controllers 203.

Figure 4:
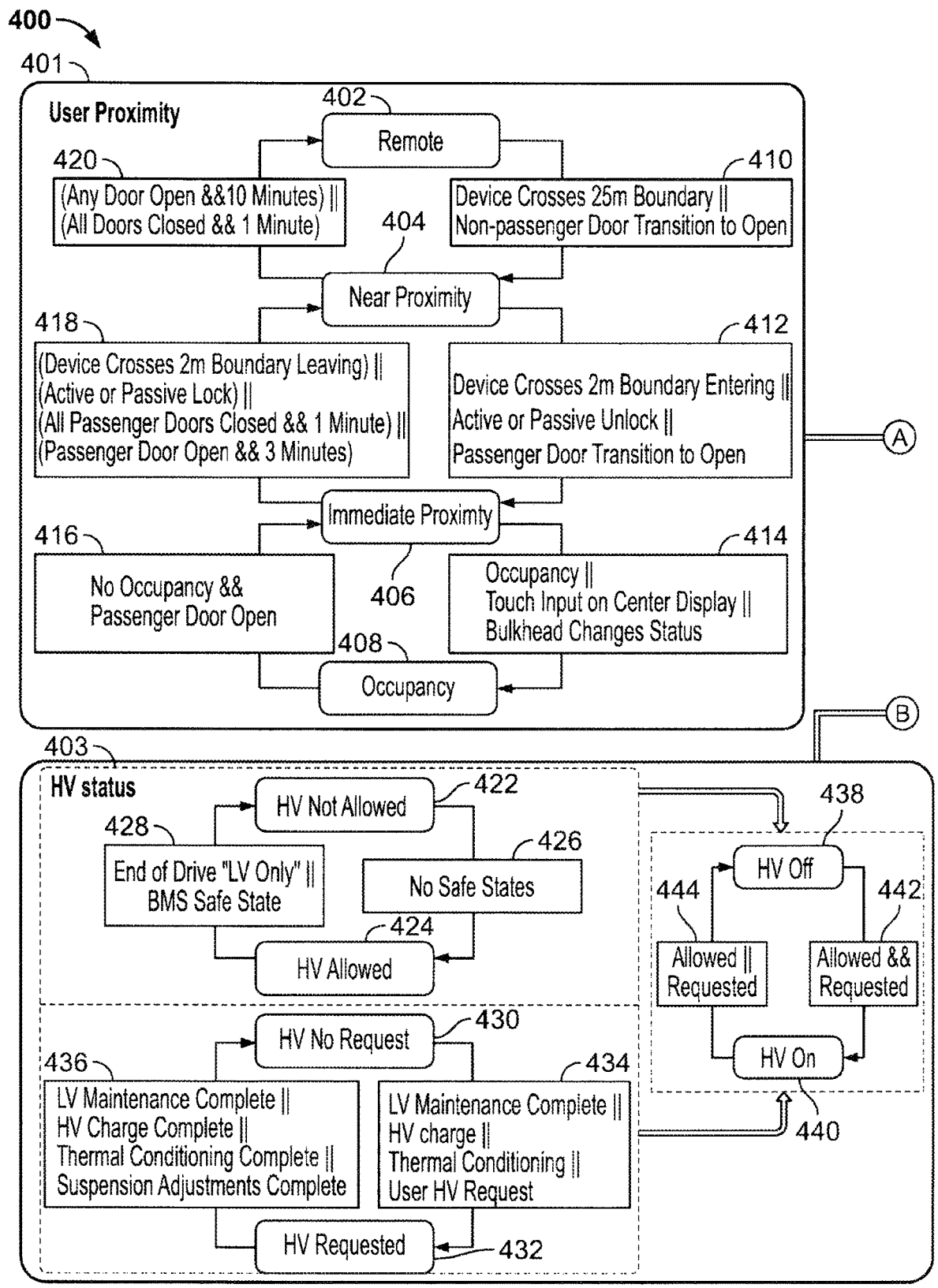
FIG. 4 illustrates a flow diagram of illustrative transitions between vehicle power mode states of the central gateway of the control system of FIG. 2, based on user proximity and a high voltage (HV) status, in accordance with some embodiments of the present disclosure.
Figure 4:
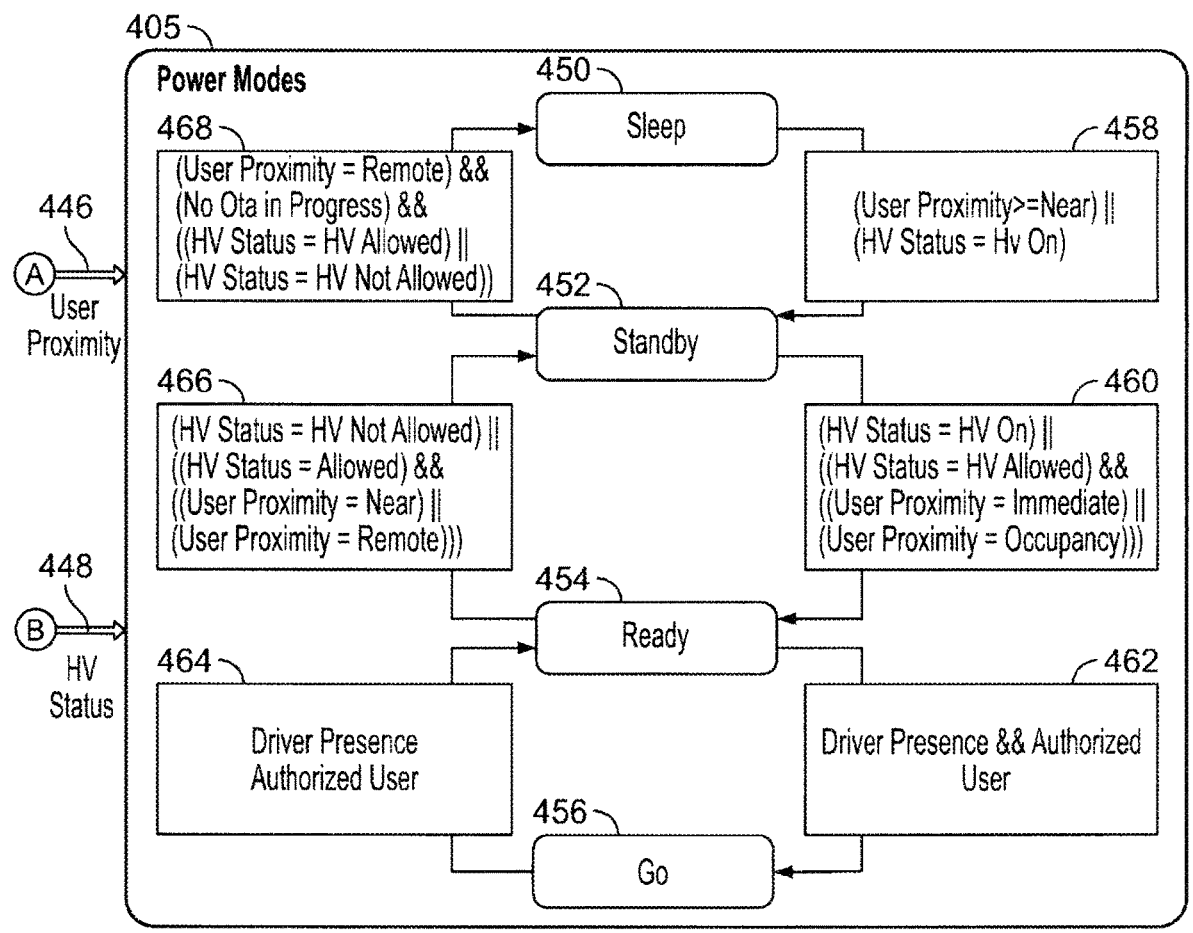

FIG. 4 illustrates a flow diagram 400 of illustrative transitions between vehicle power mode states of central gateway 201 of control system 200 of FIG. 2, based on user proximity 401 and high voltage (HV) status 403, in accordance with some embodiments of the present disclosure. As shown, user proximity signal 446 (e.g., a first signal) indicates a determined proximity of a user (e.g., remote 402, near proximity 404, immediate proximity 406, or occupancy 408), and HV status signal 448 (e.g., a second signal) indicating a HV status (e.g., HV off 438 or HV on 440) may be received by central gateway 201. Based on received user proximity signal 446 and HV status signal 448, central gateway 201 may determine an appropriate vehicle power mode state (e.g., sleep state 450, standby state 452, ready state 454, or go state 456) of central gateway 201 of control system 200, as shown by power modes flowchart 405. In some embodiments, the illustrated power mode states (e.g., sleep state 450, standby state 452, ready state 454, and go state 456) may correspond to the vehicle power mode states described above with reference to FIG. 3 (e.g., sleep state 302, standby state 304, ready state 306, and go state 308). In some embodiments, driver presence and user proximity module 226 of FIG. 2 may execute the method illustrated in user proximity flowchart 401. However, this is only an example, and the VAS described below with reference to FIG. 5 may also execute the method illustrated in user proximity flowchart 401. In some embodiments, BMS 210 of FIG. 2 may execute the method illustrated in HV status flowchart 403. For purposes of description, the process of user proximity flowchart 401 is described as being performed by a user proximity application (e.g., executed driver presence and user proximity module 226), and the process of HV charging status flowchart 403 is described as being performed by an HV status application (e.g., by BMS 210 of FIG. 2).

As shown in user proximity flowchart 401, at step 410, in response to determining that a device associated with vehicle 101 (e.g., user device 138 of FIG. 1) enters a zone within twenty-five meters of vehicle 101 or whether a non-passenger door (e.g., the driver door) opens, the user proximity application transitions the current proximity state from remote state 402 to near proximity state 404. At step 412, in response to determining that: the device enters a zone within two meters of vehicle 101; an active or passive unlock is received; or a passenger door transitions to open, the user proximity application transitions from the current proximity state from near proximity state 404 to immediate proximity state 406. At step 414, in response to determining that: vehicle 101 is occupied; a touch input is received on a display screen in vehicle 101; or a bulkhead changes status, the user proximity application transitions from the current proximity state from immediate proximity state 406 to occupancy state 408.

As also shown in user proximity flowchart 401, at step 416, in response to determining that vehicle 101 is no longer occupied and a passenger door is open, the user proximity application transitions from the current proximity state from occupancy state 408 to immediate proximity state 406. At step 418, in response to determining that: the device exits the zone within two meters of vehicle 101; an active or passive lock command is received; at least one minute has elapsed since all passenger doors were closed; or at least one passenger door remains open and three minutes have elapsed, the user proximity application transitions from the current proximity state from immediate proximity state 406 to near proximity state 404. At step 420, in response to determining that: any door is open and at least ten minutes have elapsed; at least one minute has elapsed since all doors were closed, the user proximity application transitions from the current proximity state from near proximity state 404 to remote state 402. Although specific triggers are described for transitioning between the user proximity states, it should be understood that any other suitable triggers that reflect a user's intent to enter and use vehicle 101 may be used. In response to the proximity state being updated, the user proximity application communicates user proximity signal 446 (e.g., to power modes module 216 of FIG. 2).

As shown in HV status flowchart 403, at step 426, in response to determining that no safe states exist (e.g., such as a battery safe state condition), the HV status application transitions the current HV allow state from HV not allowed 422 to HV allowed 424. At step 428, in response to determining that a safe state exits (e.g., a safe state generated by BMS 210 of FIG. 2), the HV status application transitions the current HV allow state HV allowed 424 to HV not allowed. In some embodiments, the HV allow state may also be based on the status of an over-the-air OTA update.

As also shown in HV status flowchart 403, at step 434, in response to determining that: LV maintenance is being performed; HV charge is active; thermal conditioning is requested; or a user HV request is received (e.g., to power a vehicle appliance), the HV status application transitions the current HV request state from no HV request 430 to HV requested 432. At step 436, in response to determining that: LV maintenance is complete; HV charge is complete; thermal conditioning is complete; or suspension adjustments are complete, the HV status application transitions the current HV request state from HV requested 432 to no HV request 430. In some embodiments, the HV request state may also be based on the status of an OTA update.

As also shown in HV status flowchart 403, based on the current HV allow state and the current HV request state, the HV status application transitions the current HV state between OFF (HV OFF 438) and ON (HV ON 440). For example, at step 442, in response to determining that the current HV allow state is HV allowed 424 and that the current HV request state is HV requested 432, the HV status application transitions the current HV state from HV OFF 438 to HV ON 440. At step 444, in response to determining that the current HV allow state is HV not allowed 422 and the current HV requested state is no HV request 430, the HV status application transitions the current HVE state from HV ON 440 to HV off 438. Although specific triggers are described for transitioning between the HV states, it should be understood that any other suitable triggers that reflect conditions that require use of the HV systems of vehicle 101. In response to the HV state, the HV status application communicates HV status signal 446 (e.g., to power modes module 216 of FIG. 2).

As shown in power modes flowchart 405, based on the current user proximity status and HV status (e.g., user proximity signal 446 and HV status signal 448), the vehicle power modes application (e.g., implemented by central gateway 201 of FIG. 2) determines the current vehicle power mode state (e.g., sleep state 450, standby state 452, ready state 454, or go state 456). The vehicle power mode states may correspond to the vehicle power mode states described above in, e.g., FIG. 3. For example, at step 458, in response to determining that the current user proximity is near proximity 404 or the current HV status is HV ON 440 (e.g., HV required), the vehicle power modes application transitions from sleep state 450 to standby state 452. At step 460, in response to determining that: the current HV status is HV ON 440 (e.g., HV required); the current HV status is HV allowed 424 and the current user proximity is immediate proximity 406; or the current user proximity is occupancy 408, the vehicle power modes application transitions from standby state 452 to ready state 454. At step 462, in response to determining that a driver is present and that the driver is an authorized user, the vehicle power modes application transitions from ready state 454 to go state 456.

As also shown in power modes flowchart 405, at step 464, in response to determining that the driver is not present or that the driver is not an authorized user, the vehicle power modes application transitions from go state 456 to ready state 454. At step 466, in response to determining that: the current HV status is HV not allowed 422; the current HV status is HV allowed 424 and the current user proximity is near proximity 404; or the current user proximity is remote 402, the vehicle power modes application transitions from ready state 454 to standby state 452. At step 468, in response to determining that: the current user proximity is remote 402 and no OTA is currently in progress and the current HV status is HV allowed 424; or the current HV status is HV not allowed, the vehicle power modes application transitions from standby state 452 to sleep state 450. As described above, central gateway 201 may broadcast the current vehicle power mode to domain controllers 203 of control system 200.

Figure 5:
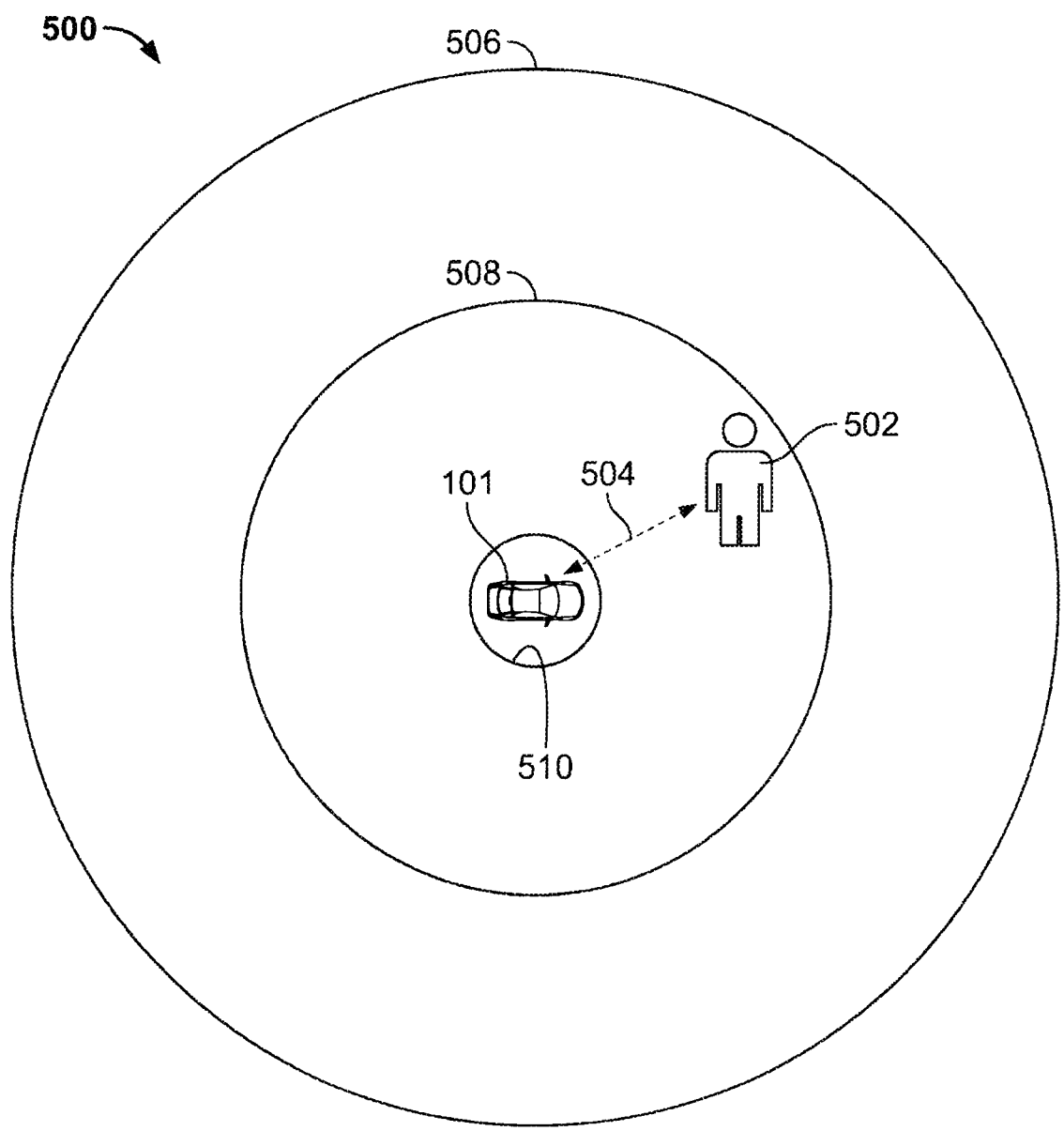
FIG. 5 shows an illustrative diagram for providing a user with passive access to the vehicle, in accordance with some embodiments of the present disclosure.

FIG. 5 shows an illustrative diagram 500 for providing a user with passive access to vehicle 101, in accordance with some embodiments of the present disclosure. The process may be executed by processing circuitry 102 of FIG. 1, or, more specifically, control system 200 of FIG. 2. As shown, user 502 may be located outside of vehicle 101. As described above, control system 200 of vehicle 101 may have transitioned to a sleep state in order to conserve battery. While in the sleep state, control system 200 may monitor the area around vehicle 101 to detect the presence of user 502. For example, in one embodiment, the VAS (e.g., a domain controller/module implemented by communications circuitry 136 of FIG. 1) may listen, using a plurality of BLE sensors, for an advertisement from an authorized mobile device (e.g., user device 138) of user 502, transmitted according to the BLE standard. Based on the range of BLE, the VAS may detect an advertisement from the authorized mobile device when the device is within a far zone from the vehicle, defined by boundary line 506 (which may be approximately 90 meters from vehicle 101, plus or minus 10 meters) and boundary line 508 (which may be approximately 25 meters from vehicle 101, plus or minus 5 meters). In response to detecting the authorized mobile device, the VAS may determine a distance (e.g., distance 504) between vehicle 101 and the authorized mobile device. For example, the plurality of BLE sensors may be disposed at different locations with vehicle 101. The VAS may determine a received signal strength indicator (RSSI) of the advertisement at each of the plurality of BLE sensors and select the one with the highest RSSI to determine the distance of the authorized mobile device from the vehicle. For example, the BLE sensor with the highest RSSI may correspond to the BLE sensor with the best line-of-sight to the authorized mobile device and may therefore provide the best estimate of the distance of the authorized mobile device from the vehicle. While the authorized mobile device is determined to be outside of boundary line 508 (a first distance from vehicle 101), the VAS may continue to monitor the location of the authorized mobile device, without, e.g., sending a notification to the central gateway or waking up any other domain controllers. In one approach, central gateway 201 may implement the functions of the VAS (e.g., driver presence and user proximity module 226 and user authorization module 228 of FIG. 2 may implement the functions of the VAS).

In response to determining that the authorized mobile device continues to approach vehicle 101 and enters a near zone defined by boundary line 508 and boundary line 510 (which may be approximately 2 meters from vehicle 101, plus or minus 1 meter), the VAS may send a notification to central gateway 201 indicating that a user is approaching. In response to receiving the notification, central gateway 201 may broadcast a standby command to each of the domain controllers 203 of control system 200. In response to receiving the standby command, certain domain controllers 203 may determine to transition to the standby state, so that the domain controllers may be quickly transitioned to a ready state when user 502 reaches vehicle 101. Certain domain controllers (ECUs) may take several seconds or tens of seconds to transition to a standby state. Thus, by transitioning these domain controllers to a standby state when user 502 is approximately 25 meters from vehicle 101, the domain controllers will have sufficient time to complete the transition to the standby state by the time the user reaches vehicle 101. In some embodiments, it may be advantageous to adjust the distance at which certain domain controllers begin transitioning from a sleep state (or stealth state) to a standby state base on a profile of user 502 (e.g., average walking speed) or the average transition time of each domain controller. For example, with reference to FIG. 2, XMM 204 may take several tens of seconds to transition to a standby state, while BMS 208 may take only a few seconds to transition to a standby state. Thus, XMM 204 may begin to transition to the standby state when user 502 is approximately 25 meters from vehicle 101, while BMS 208 may begin to transition to the standby state user 502 is approximately 10 meters from vehicle 101. In this way, battery power may be conserved if user 502 does not enter vehicle 101.

In some embodiments, in response to determining that the authorized mobile device enters the near zone, TCM 202 may establish a two-way wireless connection (e.g., a connection via the BLE standard) between the vehicle and the authorized mobile device.

In some embodiments, it may be advantageous to detect a location of vehicle 101 (e.g., using GPS system 134 of FIG. 1) and adjust the wake-up behavior based on the detected location. For example, if vehicle 101 is located at a home of user 502, user 502 may pass by vehicle 101 several times a day without intending to enter vehicle 101. In this case, central gateway 201 may determine to broadcast a vehicle power modes command to domain controllers 203 to transition to the standby state (e.g., in response to an erroneous determination by the VAS that user 502 intends to use vehicle 101). Thus, by considering additional information to determine if user 502 is actually intending to use vehicle 101) unnecessary wake-up sequences may be reduced. In one example, central gateway 201 may determine if another device (e.g., key fob 142 of FIG. 1) is also detected. Because a user is likely to have both their key fob and authorized mobile device if they are planning on using vehicle 101, central gateway 201 may broadcast the vehicle power modes command to transition to the standby state in response to detecting both the authorized mobile device and the key fob. In another example, central gateway 201 may analyze a profile of user 502 to determine when user 502 is likely to use vehicle 101 and how often user 502 enters within the near zone of vehicle 101. Based on a result of this determination, central gateway 201 may refrain from broadcasting the command to transition to the standby state until the authorized mobile device is closer to vehicle 101 (e.g., based on an increasing confidence that user 502 intends to use vehicle 101 as user 502 continues to approach).

In response to determining that the authorized mobile device continues to approach vehicle 101 and enters the immediate zone defined by boundary line 510, certain domain controllers may initiate a welcome action of vehicle 101. The welcome action may include one or more operations to greet user 502. For example, the welcome action may include unlocking a door of vehicle 101 as well as, e.g., turning on an exterior light of vehicle 101 (e.g., the light bar or headlights), turning on an interior light of vehicle 101, flashing one or more lights in a welcome sequence, outputting, via a speaker of vehicle 101, a welcome sound that is audible to user 502 as they approach vehicle 101 (e.g., "welcome"). In some embodiments, one or more welcome actions may be personalized for user 502. For example, the welcome sound may be a personalized greeting, based on a name stored in a profile of user 502 (e.g., "Welcome Bob"). In some embodiments, user 502 may create or modify the welcome action (e.g., via input interface 122 of FIG. 1). In some embodiments, the welcome action may include playing media that is currently playing on the authorized mobile device (e.g., on the entertainment system of vehicle 101). In some embodiments, the welcome action may include adjusting the driver seat, mirror, steering column, etc., to positions associated with user 502 based on stored user profile. In other embodiments, the timing of the wake-up sequence may be based on predicted behavior of the user or previously identified characteristics of the user. For example, the wake-up sequence may initiate at a further distance and earlier time for a fast-walking user previously identified based on sensors and distance calculation of the mobile device/key as it approaches vehicle, while initiating at a slightly delayed timing from a normal timing for an identified slower-paced user, which may be useful to further conserve the battery power.

In some embodiments, the welcome action may be based on the current location of vehicle 101. For example, if vehicle 101 is at a shopping center, the welcome action may include opening a storage door of vehicle 101 (e.g., so that user 502 may place items in a storage area of vehicle 101 (e.g., a frunk or trunk). If vehicle 101 is parked in a parking space between two other vehicles, the welcome action may include automatically moving vehicle 101 out of the parking space (e.g., to allow user 502 easy access to vehicle 101).

Although the above process has been described with respect to an authorized mobile device, it should be understood that the process may be performed by detecting a key fob (e.g., key fob 142 of FIG. 1) and determining a distance of the key fob from vehicle 101 (e.g., using a one or more sensors to determine the position of the key fob with respect to vehicle 101). For example, the distance may be calculated based on, for example, signal strength.

Figure 6:
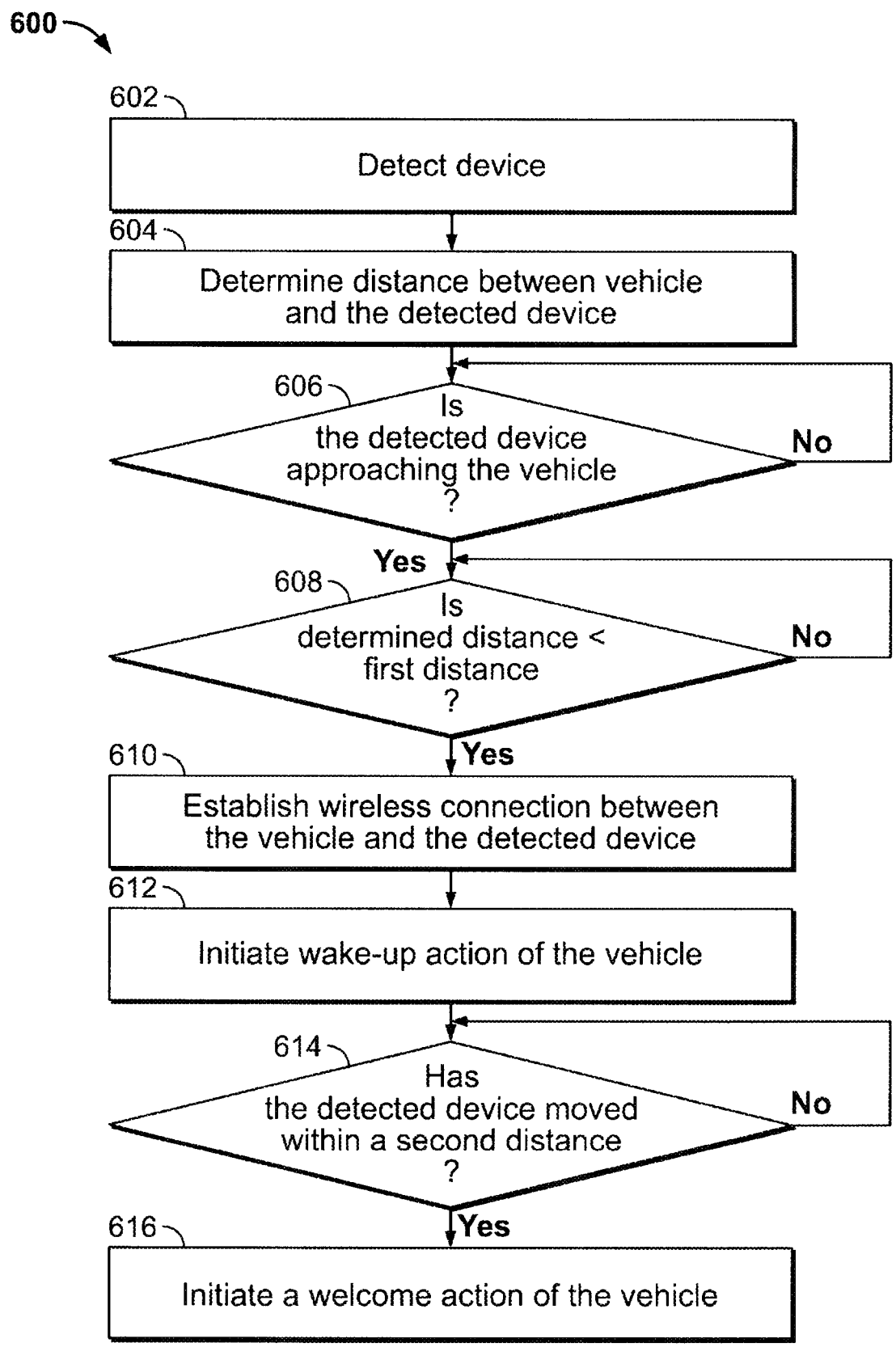
FIG. 6 shows a flowchart of an illustrative process for providing a user with passive access to the vehicle, in accordance with some embodiments of the present disclosure.

FIG. 6 shows a flowchart of an illustrative process 600 for providing a user with passive access to vehicle 101, in accordance with some embodiments of the present disclosure. Process 600 is described as being executed by processing circuitry 102. However, it should be noted that process 600, or any step thereof, could be performed on, or provided by, any of the modules (domain controllers 203) described above in FIG. 2.

Process 600 begins at step 602 when processing circuitry 102 detects a device (e.g., user device 138 or key fob 142) in the vicinity of vehicle 101. For example, processing circuitry 102 may detect an advertisement signal from the device (e.g., via BLE) or a response to an advertisement (e.g., via passive keyless entry key fob). In some embodiments, processing circuitry 102 may authenticate the detected device and retrieve a profile associated with the detected device.

At 604, processing circuitry 102 may determine the distance between vehicle 101 and the detected device. For example, processing circuitry may process a signal received by a plurality of VAS sensors distributed in different locations in vehicle 101 to determine an RSSI of the signal at each sensor and determine the distance of the detected device from vehicle 101 based on the highest RSSI. In another example, processing circuitry may process a signal received by a single VAS sensor to determine an RSSI of the signal to determine the distance of the detected device with respect to vehicle 101.

At 606, processing circuitry 102 may determine if the detected device is approaching vehicle 101. For example, processing circuitry 102 may monitor the position of the detected device to determine the trajectory of the detected device (e.g., associated with a user). In response to determining that the detected device is not approaching vehicle 101 ("No" at step 606), process 600 remains at step 606 and continues to monitor the position of the detected device. Otherwise ("Yes" at step 606), process 600 proceed to step 608.

At 608, processing circuitry 102 determines if the detected device is within a first distance of vehicle 101. For example, processing circuitry 102 may determine if the detected device is within about 25 meters of vehicle 101. In some embodiments, the first distance may be adjusted based on the profile of the user of a location of vehicle 101. In response to determining that the detected device is not within the first distance ("No" at step 608), process 600 remains at step 608. Otherwise ("Yes" at step 608), process 600 proceeds to step 610.

At step 610, processing circuitry 102 establishes a two-way wireless connection between vehicle 101 and the detected device (e.g., via communications circuitry 136). For example, the connection may be a connection via the BLE standard.

At 612, processing circuitry 102 initiates a wake-up action of vehicle 101. The wake-up action may include a wake-up sequence of at least one electronic control unit (ECU) or at least one program module of vehicle 101. For example, processing circuitry 102 may initiate a wake-up sequence such that systems of vehicle 101 are available for immediate use to a user once the user gets into vehicle 101 (e.g., by initiating a wake-up sequence of domain controllers 203 of FIG. 2).

At 614, processing circuitry 102 determines if the detected device has moved within a second distance of vehicle 101. For example, processing circuitry 102 may determine if the detected device is within about 2 meters of vehicle 101. In response to determining that the detected device is not within the second distance ("No" at step 614), process 600 remains at step 614. Otherwise ("Yes" at step 614), process 600 proceeds to step 616.

At 616, processing circuitry 102 initiates a welcome action of vehicle 101. The welcome action may include one or more operations to greet the user and provide passive entry into vehicle 101. For example, the welcome action may include unlocking a door of vehicle 101, adjusting a seat location of a seat (e.g., seat 135) based on a profile of the user, turning on an exterior light and/or an interior light (e.g., lights 133) of vehicle 101, outputting, via a speaker (e.g., speaker 132) a welcome sound that is audible to the user as they approach vehicle 101, transferring playback of content that is currently being played on the detected device to an entertainment system of (e.g., display 130 and/or speaker 132) vehicle 101, automatically opening a storage door (e.g., door 137) of vehicle 101, moving vehicle 101, etc. In some embodiments, the welcome action may be based on a profile of the user and a current location of vehicle 101.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, step 610 may be omitted. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method, comprising:
   in response to determining that a user is within a first distance from a vehicle that is stationary;
      determining a location of the vehicle;
      in response to determining that the determined location is not a home location of the vehicle, transitioning one or more electronic control units (ECUs) or at least one control module from a first power state to a second power state; and
      in response to determining that the determined location is the home location of the vehicle, refraining from transitioning from the first power state to the second power state unless a first device of the user is determined to be within a second distance from the vehicle or a second device is also determined to be within the first distance; and
   in response to determining that the first device of the user is within the second distance from the vehicle, causing the one or more ECUs or the at least one control module of the vehicle to execute an action associated with the vehicle.

2. The method of claim 1, wherein transitioning the one or more ECUs or the at least one control module comprises transitioning the one or more ECUs or the at least one control module from a sleep state to an active state.

3. The method of claim 1, wherein executing the action associated with the vehicle comprises:
   unlocking a door of the vehicle; and
   at least one of:
      turning on an exterior light of the vehicle;

turning on an interior light of the vehicle; and
outputting, via a speaker of the vehicle, a welcome sound that is audible from outside the vehicle.

4. The method of claim 1, wherein the first distance is approximately 25 meters and the second distance is approximately 2 meters.

5. The method of claim 1, wherein determining that the user is within the first distance from the vehicle comprises:
detecting a mobile device of the user when the mobile device is outside the first distance from the first vehicle; and
monitoring a distance of the mobile device from the vehicle.

6. The method of claim 5, further comprising:
in response to determining that the mobile device is within the first distance from the vehicle based on the monitored distance, establishing a two-way wireless connection between the vehicle and the mobile device.

7. The method of claim 1, further comprising:
detecting, via a plurality of sensors of the vehicle, a signal from [a] the second device of the user;
determining, for each of the plurality of sensors, a received signal strength indicator (RSSI) of the signal; and
determining, based on the determined RSSI of the signal detected by each of the plurality of sensors, a distance of the second device from the vehicle,
wherein the determination that the second device is within the first distance from the vehicle is based on the determined distance.

8. The method of claim 1, further comprising:
identifying a user profile associated with the user; and
personalizing the action associated with the vehicle based on the identified user profile.

9. The method of claim 1, further comprising:
determining whether to open a storage door of the vehicle, based on the determined location,
wherein executing the action associated with the vehicle comprises opening the storage door of the vehicle in response to determining to open the storage door of the vehicle.

10. A system, comprising:
a memory storing instructions; and
control circuitry configured to execute the instructions stored in the memory to:
determine a location of a vehicle;
transition, in response to determining that a user is within a first distance from the vehicle that is stationary and in response to determining that the determined location is not a home location of the vehicle, one or more electronic control units (ECUs) or at least one control module from a first power state to a second power state;
in response to determining that the determined location is the home location of the vehicle, refrain from transitioning from the first power state to the second power state unless a first device of the user is determined to be within a second distance from the vehicle or a second device is also determined to be within the first distance; and
cause, in response to determining that the first device of the user is within the second distance from the vehicle, the one or more ECUs or the at least one control module of the vehicle to execute an action associated with the vehicle.

11. The system of claim 10, wherein the control circuitry is configured to transition the one or more ECUs or the at least one control module of the vehicle by transitioning the one or more ECUs or the at least one control module from a sleep state to an active state.

12. The system of claim 10, wherein the action associated with the vehicle comprises:
unlocking a door of the vehicle; and
at least one of:
turning on an exterior light of the vehicle;
turning on an interior light of the vehicle; and
outputting, via a speaker of the vehicle, a welcome sound that is audible from outside the vehicle.

13. The system of claim 10, wherein the control circuitry is configured to determine that the user is within the first distance from the vehicle by:
detecting a mobile device of the user when the mobile device is outside the first distance from the first vehicle; and
monitoring a distance of the mobile device from the vehicle.

14. The system of claim 13, wherein the control circuitry is further configured to establish, in response to determining that the mobile device is within the first distance from the vehicle based on the monitored distance, a two-way wireless connection between the vehicle and the mobile device.

15. The system of claim 10, wherein the control circuitry is further configured to:
detect, via at least a plurality of sensors of the vehicle, a signal from the second device of the user;
determine, for each of the plurality of sensors, a received signal strength indicator (RSSI) of the signal; and
determine, based on the determined RSSI of the signal detected by each of the plurality of sensors, a distance of the second device from the vehicle,
wherein the determination that the second device is within the first distance from the vehicle is based on the determined distance.

16. The system of claim 10, wherein the control circuitry is further configured to:
identify a user profile associated with the user; and
personalize the action associated with the vehicle based on the identified user profile.

17. The system of claim 10, wherein the control circuitry is further configured to:
determine whether to open a storage door of the vehicle, based on the determined location; and
cause, when executing the action associated with the vehicle, the one or more ECUs or the at least one control module of the vehicle to open the storage door of the vehicle in response to determining to open the storage door of the vehicle.

18. A non-transitory computer-readable medium having non-transitory computer-readable instructions encoded thereon that, when executed by control circuitry, cause the control circuitry to:
determine a location of a vehicle;
transition, in response to determining that a user is within a first distance from the vehicle that is stationary and in response to determining that the determined location is not a home location of the vehicle, one or more electronic control units (ECUs) or at least one control module from a first power state to a second power state;
in response to determining that the determined location is the home location of the vehicle, refrain from transitioning from the first power state to the second power state unless a first device of the user is determined to be within a second distance from the vehicle or a second device is also determined to be within the first distance; and cause, in response to determining that the first device of the user is within the second distance from the vehicle, the one or more ECUs or the at least one control module of the vehicle to execute an action associated with the vehicle.

\* \* \* \* \*